US012120969B2

(12) United States Patent
Bermudez

(10) Patent No.: US 12,120,969 B2
(45) Date of Patent: Oct. 22, 2024

(54) HANDHELD LAWN MAINTENANCE TOOL

(71) Applicant: MTD Products Inc, Valley City, OH (US)

(72) Inventor: Robert Bermudez, Gilbert, AZ (US)

(73) Assignee: MTD PRODUCTS INC, Valley City, OH (US)

( * ) Notice: Subject to any disclaimer, the term of this patent is extended or adjusted under 35 U.S.C. 154(b) by 148 days.

(21) Appl. No.: 15/010,662

(22) Filed: Jan. 29, 2016

(65) Prior Publication Data

US 2016/0227694 A1 Aug. 11, 2016

Related U.S. Application Data

(60) Provisional application No. 62/112,962, filed on Feb. 6, 2015.

(51) Int. Cl.
| | | |
|---|---|---|
| *A01B 1/20* | (2006.01) | |
| *A01B 1/06* | (2006.01) | |
| *A01D 34/416* | (2006.01) | |
| *A01D 34/84* | (2006.01) | |
| *A01D 34/90* | (2006.01) | |
| *A01G 3/053* | (2006.01) | |
| *A01G 3/06* | (2006.01) | |
| *A01G 3/08* | (2006.01) | |

(Continued)

(52) U.S. Cl.
CPC ............... *A01B 1/20* (2013.01); *A01B 1/065* (2013.01); *A01D 34/4165* (2013.01); *A01D 34/84* (2013.01); *A01D 34/90* (2013.01); *A01G 3/0535* (2013.01); *A01G 3/062* (2013.01); *A01G 3/086* (2013.01); *E01H 1/0809* (2013.01); *A01D 42/00* (2013.01); *B25F 3/00* (2013.01)

(58) Field of Classification Search
CPC ...... A01B 1/065; A01B 1/20; A01D 34/4165; A01D 34/90; A01D 34/84; A01G 3/0535; A01G 3/062; A01G 3/086; E01H 1/0809
USPC .......................................................... 172/14
See application file for complete search history.

(56) References Cited

U.S. PATENT DOCUMENTS 3,129,771 A * 4/1964 Lidstone ................ A01B 1/065
  172/111
D250,450 S * 12/1978 Tiedemann ....................... 30/276

(Continued)

FOREIGN PATENT DOCUMENTS

CA    2851978     5/2013
CN    18600844    11/2006

(Continued)

OTHER PUBLICATIONS

"40V-X Expand-It String Trimmer;" Archived Jul. 23, 2014; Retrieved Jul. 20, 2018; Ryobi Tools; <https://web.archive.org/web/20140723231157/https://www.ryobitools.com/outdoor/products/details/578>.*

(Continued)

*Primary Examiner* — Thomas B Will
*Assistant Examiner* — Joel F. Mitchell
(74) *Attorney, Agent, or Firm* — Wegman Hessler Valore

(57) ABSTRACT

A handheld lawn maintenance tool having a power head to which an adapter is attachable to allow both battery-powered and gasoline-powered working attachments to be attached thereto. The power head includes a power source, integrated first and second handles, a power generator, and a first attachment mechanism to which the adapter and/or working attachments are attachable.

18 Claims, 8 Drawing Sheets

(51) Int. Cl.
*E01H 1/08* (2006.01)
*A01D 42/00* (2006.01)
*B25F 3/00* (2006.01)

(56) References Cited

U.S. PATENT DOCUMENTS

| | | | |
|---|---|---|---|
| 4,286,675 A | 9/1981 | Tuggle | |
| 4,588,335 A * | 5/1986 | Pearson, Jr. | B23B 31/1074 |
| | | | 279/76 |
| 5,181,369 A | 1/1993 | Everts | |
| 5,184,369 A | 2/1993 | McElroy | |
| 5,265,341 A | 11/1993 | Kikuchi | |
| 5,345,684 A | 9/1994 | Shoup | |
| 5,809,653 A * | 9/1998 | Everts et al. | A01D 34/90 |
| | | | 15/328 |
| 5,810,093 A * | 9/1998 | Howard | A01B 1/065 |
| | | | 172/111 |
| 5,815,928 A * | 10/1998 | Cline | A01D 34/90 |
| | | | 172/13 |
| 5,862,595 A * | 1/1999 | Keane | A01D 34/90 |
| | | | 30/124 |
| 5,987,756 A | 11/1999 | Yates et al. | |
| 6,006,434 A | 12/1999 | Templeton | |
| D510,512 S | 10/2005 | Robson | |
| 6,955,227 B1 * | 10/2005 | Motosko | A01B 1/065 |
| | | | 172/111 |
| 6,973,728 B2 * | 12/2005 | Ellson | A01D 34/90 |
| | | | 172/14 |
| D551,921 S * | 10/2007 | Houghton | D8/8 |
| 7,484,300 B2 | 2/2009 | King | |
| 7,627,952 B2 * | 12/2009 | Richards | A01D 34/416 |
| | | | 30/276 |
| 7,739,800 B2 * | 6/2010 | Hurley | A01D 34/905 |
| | | | 172/14 |
| 8,122,569 B2 * | 2/2012 | Paul | B25F 5/026 |
| | | | 16/426 |
| D656,371 S | 3/2012 | Sweeney | |
| 2003/0037933 A1 | 2/2003 | Breneman et al. | |
| 2006/0048397 A1 | 3/2006 | King et al. | |
| 2006/0108128 A1 * | 5/2006 | Langhans | A01D 34/826 |
| | | | 172/14 |
| 2011/0232436 A1 * | 9/2011 | Morabit | A01D 34/902 |
| | | | 83/13 |
| 2013/0075122 A1 * | 3/2013 | Yamada | A01D 34/90 |
| | | | 173/213 |
| 2014/0115903 A1 * | 5/2014 | Proudlock et al. | A01D 34/412 |
| | | | 30/276 |
| 2014/0262388 A1 | 9/2014 | Krause et al. | |

FOREIGN PATENT DOCUMENTS

| | | |
|---|---|---|
| CN | 202019552 | 11/2011 |
| EP | 2 407 021 | 1/2012 |
| EP | 2 580 954 | 4/2013 |

OTHER PUBLICATIONS

International Search Report and Written Opinion for International Application No. PCT/US2016/015662 dated Apr. 11, 2016.
Canadian Office Action for corresponding Canadian Application No. 2,974,963 dated Jun. 15, 2018.
First Office Action corresponding to Chinese Patent Application No. 201680008830.6 dated Dec. 13, 2018, 9 pages.
Canadian Office Action for corresponding Canadian Application No. 2,974,963 dated Mar. 18, 2019, 4 pages.
Second Office Action for corresponding Chinese Application No. 201680008830.6 filed Jan. 29, 2016 dated Sep. 11, 2019, 7 pages long.
Any and All Online Auctions [May 2014]. Lot #119: Black & Decker weedwacker & Craftsman Hedger. https://www.anyandallauctions.com.
Black & Decker [2012]. Model No. GH3000. https://wwwblackanddecker.com.
VM Innovations [Feb. 6, 2013]. Black & Decker NST2118R. https://vminnovations.com.
Price Spy [2009]. Bosch ART 23 Li. https://pricespy.co.uk.
Notice of Allowance dated Jan. 8, 2021 for U.S. Appl. No. 16/206,150 (pp. 1-6).
40V-X Expand-It String Trimmer Jul. 23, 2014 (Ryobi Tools).
Canadian Corrective Office Action for corresponding Canadian Application No. 2,974,963 dated Jun. 4, 2019, 3 pages.
Canadian Office Action for corresponding Canadian Application No. 2,974,963 dated Feb. 7, 2020, 6 pages.
EPC Communication pursuant to Article 94(3) EPC for corresponding European Patent Application No. 16705379.2 dated Mar. 16, 2020, 4 pages long.
EPC Communication pursuant to Article 94(3) EPC for corresponding European Patent Application No. 16705379.2 dated May 13, 2019, 4 pages long.
EPC Communication pursuant to Article 94(3) EPC for corresponding European Patent Application No. 16705379.2 dated Sep. 19, 2018, 4 pages long.
EPC Communication under Rule 71(3)c Intention to Grant for corresponding European Patent Application No. 16705379.2 dated Sep. 29, 2020, 6 pages long.
Examination Report for corresponding Australian Patent Application No. 2016215638 dated May 24, 2019, 5 pages long.
International Preliminary Report on Patentability for corresponding International Patent Application No. PCT/US2016/015662 dated Aug. 8, 2017, 7 pages long.
Notice of Acceptance for corresponding Australian Application No. 2016215638 dated Oct. 2, 2019, 4 pages.
Notice of Allowance dated Sep. 30, 2020 for US App. No. 16/206,150 (pp. 1-6).
Notice of Third Party Observations for corresponding European Patent Application No. 16705379.2 dated Jan. 16, 2020, 106 pages.
Office Action dated Feb. 27, 2020, for US App. No. 16/206,150 (pp. 1-7).
Operator's Manual 40 Volt Power Head RY40002 May 28, 2014 (Ryobi).
Ryobi, "Operator's Manual 40 Voltpower Head RY40002", https://ia6O14O2.us.archive.org/29/items/16705379/16705379.pdf, Apr. 22, 2014 (Apr. 22, 2014).
Third Office Action for corresponding Chinese Patent Application No. 201680008830.6 dated May 29, 2020, 36 pages.
Canadian Office Action for corresponding Canadian Application No. 2,974,963 dated Nov. 16, 2020 , 5 pages.
Office Action for corresponding Canadian Patent Application No. 2,974,963, dated Feb. 28, 2022, 10 pages.
Office Action for corresponding Canadian Patent Application No. 2,974,963, dated Jun. 29, 2021, 6 pages.
Office Action for corresponding Chinese Patent Application No. 202010966186.1, dated Mar. 14, 2022, 19 pages.
Decision of Reexamination for corresponding Chinese Patent Application No. 201680008830.6, dated Aug. 23, 2022, 18 pages.
Office Action for related U.S. Appl. No. 16/206,150, dated Aug. 19, 2019, 10 pages.
Notice of Allowance for related U.S. Appl. No. 16/206,150, dated May 5, 2021, 6 pages.
Supplemental Notice of Allowabilty for related U.S. Appl. No. 16/206,150, dated May 14, 2021, 3 pages.
Supplemental Notice of Allowabilty for related U.S. Appl. No. 16/206,150, dated August 16, 2021, 4 pages.
Office Action for corresponding Canadian Patent Application No. 3,059,599, dated Mar. 31, 2022, 7 pages.
Office Action for corresponding Chinese Patent Application No. 202010966186.1, dated Oct. 10, 2022, 16 pages of which the English translation is 11 pages.
Notice of Allowance for corresponding Canadian Patent Application No. 3,059,599, dated Feb. 6, 2023, 1 pages.
Notice of Allowance for corresponding Canadian Patent Application No. 2,974,963, dated Feb. 21, 2023, 1 pages.

* cited by examiner

HANDHELD LAWN MAINTENANCE TOOL

CROSS REFERENCE TO RELATED APPLICATION

The application claims the benefit of U.S. Provisional Application No. 62/112,962, filed Feb. 6, 2015, the entire disclosure of which is hereby incorporated herein by reference.

FIELD OF THE INVENTION

The present invention is directed to a tool for performing lawn maintenance, and more particularly, to a handheld lawn maintenance tool.

BACKGROUND OF THE INVENTION

Handheld lawn maintenance tools, and more particularly, interchangeable handheld lawn maintenance tools, have become increasingly popular among homeowners. They allow homeowners to purchase a single power head that can be used to power multiple different attachments, wherein each attachment is configured to perform a different function or perform a different operation of lawn maintenance. Most power heads are fairly basic, and the attachment mechanism is typically configured to only allow similarly-branded attachments to be connected thereto.

For example, the handheld lawn maintenance tool 10a, shown as a string trimmer in FIG. 1A, includes a power head 12a that is configured to receive a battery 14a that is configured to provide electrical power. The power head 12a includes a first handle 16a that allows an operator to grasp the power head 12a during operation. The first handle 16a also includes a trigger 18a that adjusts the speed of the working attachment 20a. The working attachment 20a includes a boom 22a, a second handle 24a attached to the boom 22a, a motor 26a, and a tool 28a driven by the motor 26a. The battery 14a provides electrical power to the motor 26a to drive the tool 28a, wherein the electrical connection extends through the boom 22a. Other working attachments 20a can also be attached to the power head 12a, and with each of the other attachments, the batter 14a provides electrical power to a motor or other driver located on the working attachment 20a. Often, the motor on the working attachment 20a is typically positioned at the opposite end of the handheld lawn maintenance tool 10a relative to the battery 14a in a substantially cantilevered manner.

Another example of a handheld lawn maintenance tool 10b, shown as a string trimmer in FIG. 1B, includes a power head 12b that is configured to receive a battery 14b that is configured to provide electrical power. The power head 12b includes a first handle 16b that allows an operator to grasp the power head 12b during operation. The first handle 16b also includes a trigger 18a that adjusts the speed of the working attachment 20b. The working attachment 20b includes a boom 22b, a second handle 24b attached to the boom 22b, a motor 26b, and a tool 28b driven by the motor 26b. In a similar manner to the handheld lawn maintenance tool 10a shown in FIG. 1A, the battery 14b of this handheld lawn maintenance tool 10b provides electrical power to the motor 26b to drive the tool 28b, wherein the electrical connection extends through the boom 22b.

The weight of the motor 26a, 26b located at the end of the boom 22a, 22b in addition to the weight of the tool 28a, 28b makes operation of the handheld lawn maintenance tools 10a, 10b very awkward. The majority of the weight is located at the end of the boom 22a, 22b, which requires a counter (downward) force by the operator at the first handle 16a, 16b to try and control the movement of the tool 28a, 28b. This awkward orientation with the weight at the end of an elongated element causes additional stress and strain on an operator, which in turn, reduces the amount of time an operator is able to comfortably use the handheld lawn maintenance tool 10a, 10b.

Additionally, these battery-powered power heads 12a, 12b of the handheld lawn maintenance tools 10a, 10b are configured to only allow battery-powered working attachments to be attached thereto. Although similar gasoline engine-powered power heads are available for use with replaceable working attachments, the working attachments themselves are not interchangeable or inter-operational with battery-powered power heads.

BRIEF SUMMARY OF THE INVENTION

In one aspect of the present invention, a handheld lawn maintenance tool is provided. The handheld lawn maintenance tool includes a power head having a power source, a first handle operatively connected to a housing, a second handle operatively connected to the housing, a control mechanism positioned adjacent to the first handle, a power generator positioned within the housing, and a first attachment mechanism extending from the housing for releasably receiving a working attachment.

In another aspect of the present invention, a handheld lawn maintenance tool is provided. The handheld lawn maintenance tool includes a power head having a power source operatively connected to a housing, a first handle and a second handle integrally connected to the housing, a power generator operatively connected to the power source, and a first attachment mechanism. The handheld lawn maintenance tool further includes a working attachment having a tool and a connector extending from the tool. The connector is releasably attachable to the first attachment mechanism.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which.

Figure 1B:
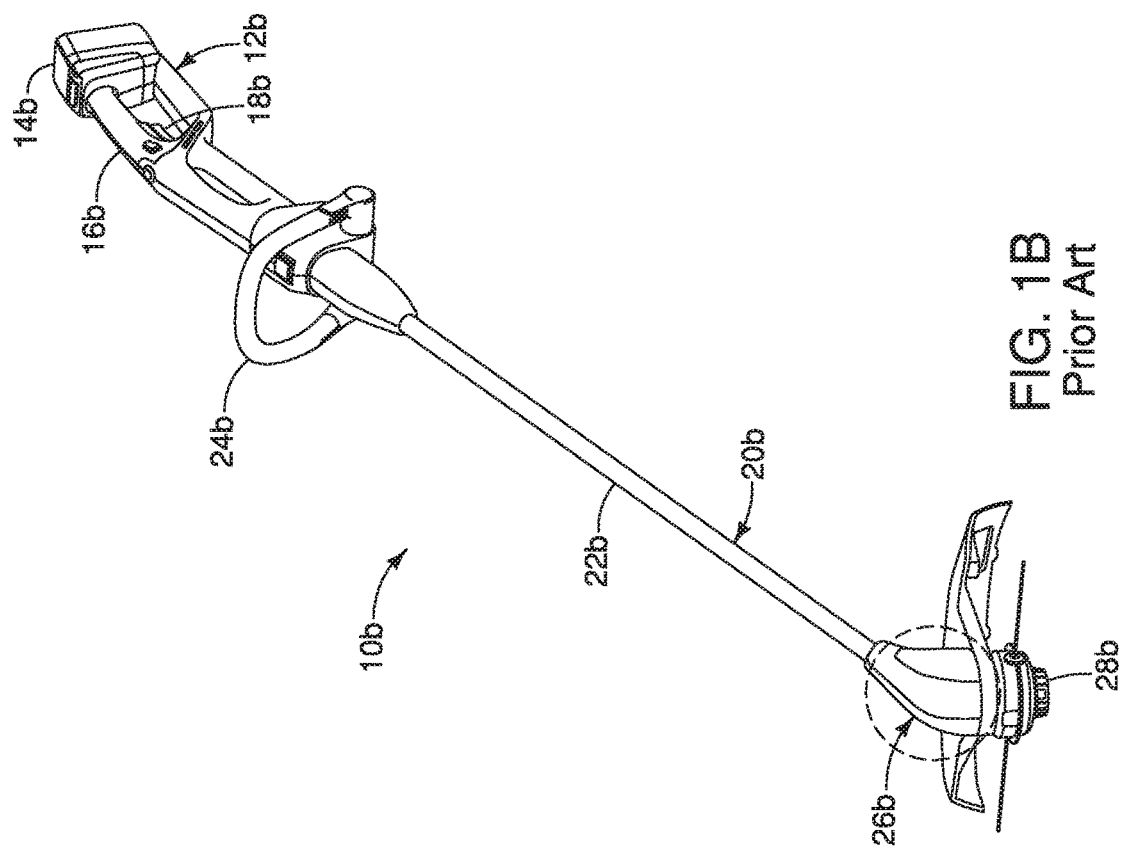
FIG. 1B is anther embodiment of a prior art string trimmer.
Figure 1A:
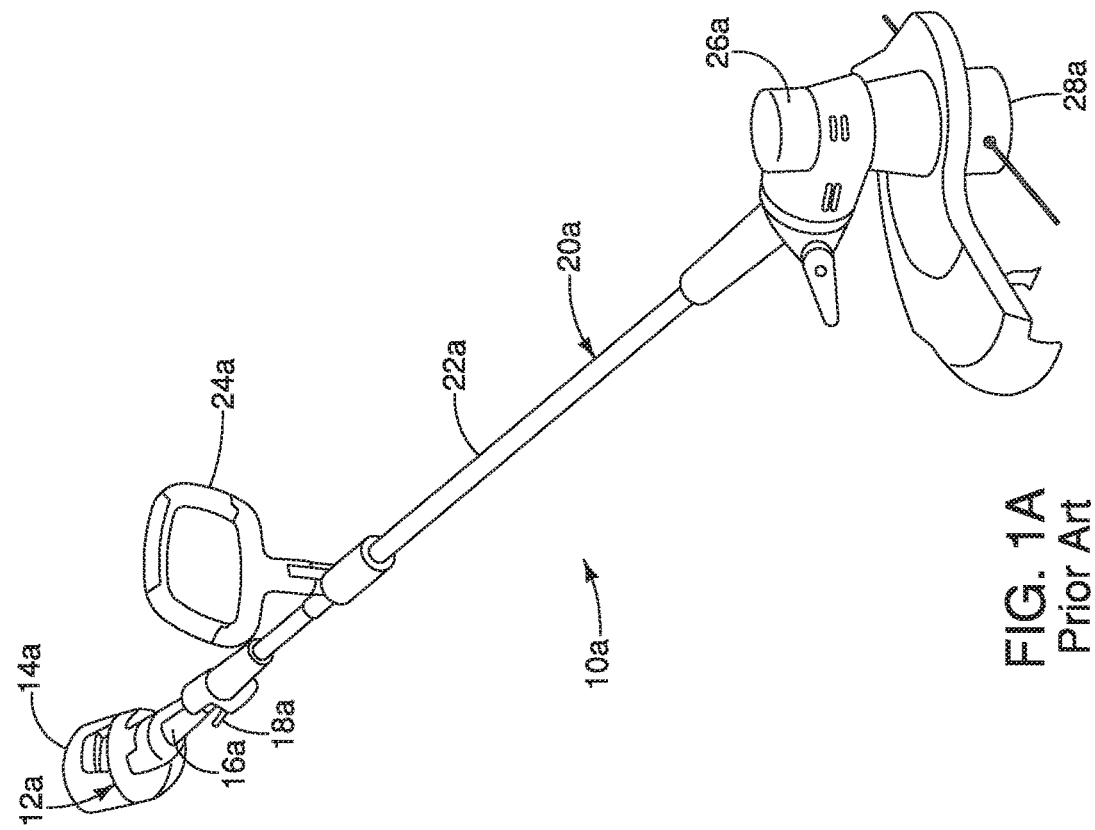
FIG. 1A is an embodiment of a prior art string trimmer.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Figure 2:
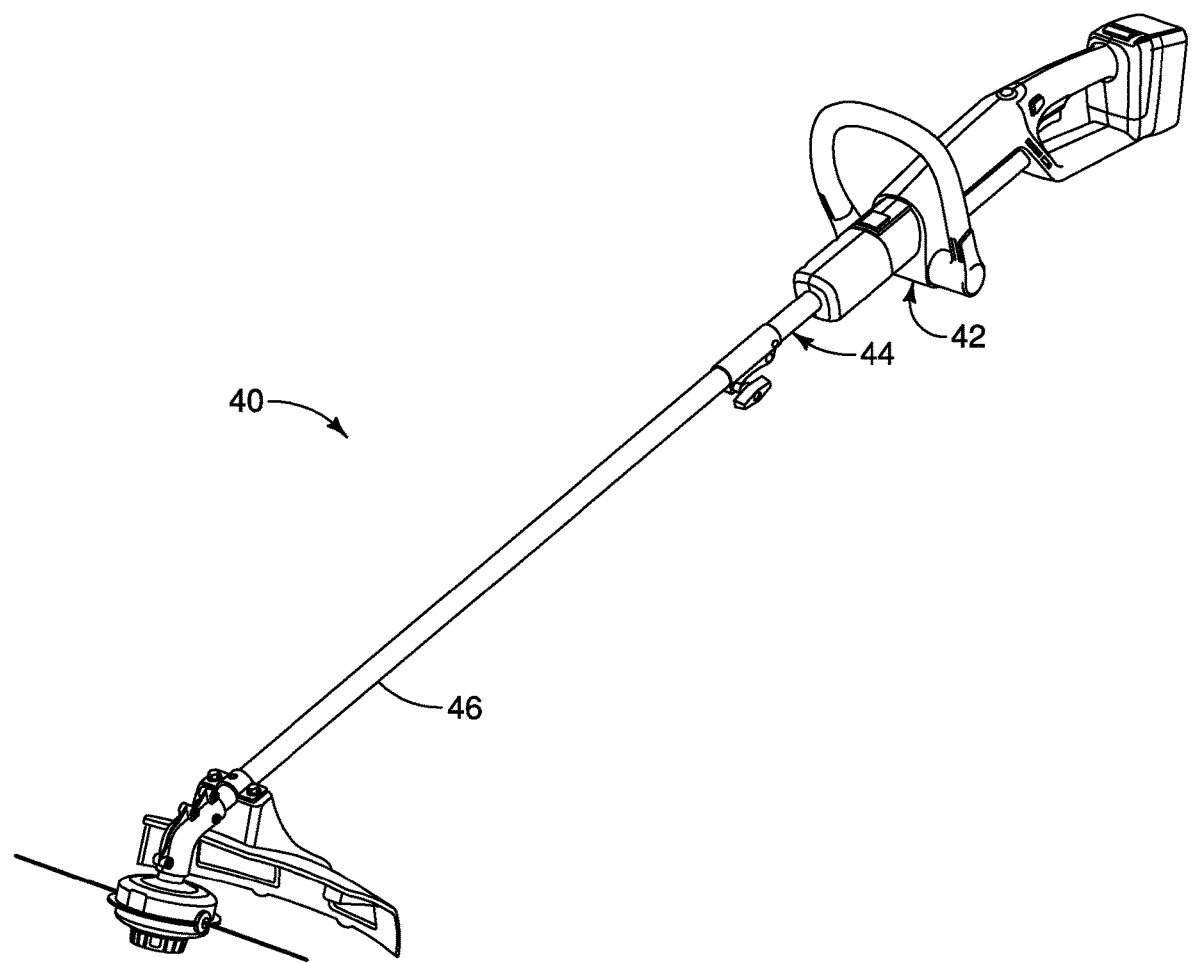
FIG. 2 is an embodiment of a handheld lawn maintenance tool.

Referring to FIG. 2, an exemplary embodiment of a handheld lawn maintenance tool 40 is shown. In the illustrated embodiment, the lawn maintenance tool 40 includes a power head 42, an adapter 44 attached to the power head, and a working attachment 46 connected to the adapter 44. In other embodiments, the working attachment 46 is attachable directly to the power head 42. The working attachment 46 shown in FIG. 2 is a string trimmer, but it should be understood by one having ordinary skill in the art that the working attachment 46 may also be a blower, hedge trimmer, edger, tiller, chainsaw or polesaw, blower, or the like. The adapter 44 allows the working attachment 46 to provide the handheld tool 40 with at least three different lengths as well as allow both battery-powered and engine-powered working attachments 46 to be attached to the power head 42, as will be explained below.

Figure 3:
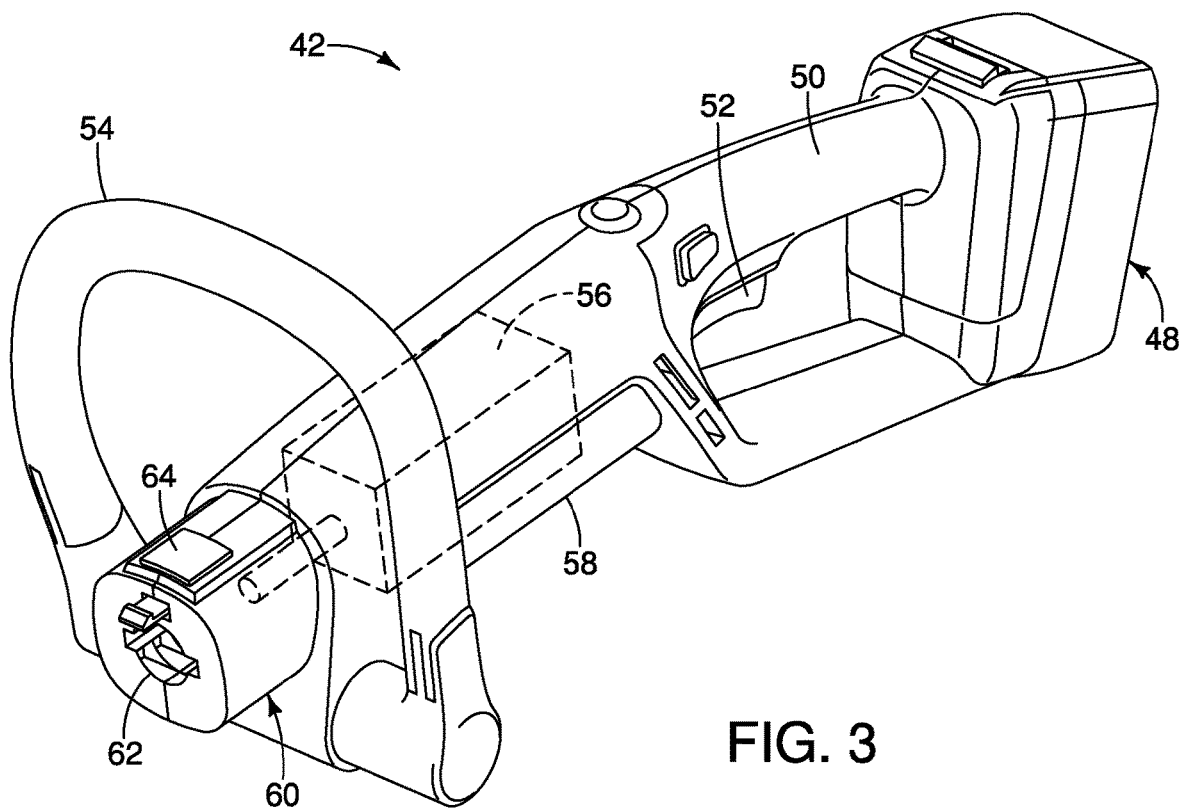
FIG. 3 is an embodiment of a power head.

In an embodiment, the power head 42 includes a power source 48, a first handle 50, a control mechanism 52, a second handle 54, a power generator 56 located within a housing 58, and a first attachment mechanism 60, as shown in FIG. 3. The power source 48 is illustrated as a battery, but it should be understood by one having ordinary skill in the art that the power source can alternatively be a connecting mechanism for creating an electrical connection via power outlet, a hybrid-electric power source, or any other compact source that can generate an electrical output. The illustrated battery can be a rechargeable or a replaceable battery. The power source 48 is removably attachable to the housing 58. The power source 48 is located at the rear of the power head 42. Because the various embodiments of the power source 48 have significant weight with respect to the remaining members of the lawn maintenance tools 10, positioning the power source 48 at the rear of the power head 42 provides a more evenly distributed weight when the working attachment 46 is attached to the forward end of the power head 42.

The first handle 50 is positioned adjacent to the rear of the power head 42, adjacent to the power source 48, as shown in FIG. 3. The first handle 50 is a member that is graspable by an operator which allows the operator to lift and carry the lawn maintenance tool 10 as well as control the movement of the working attachment 46 (FIG. 2) attached to the power head 42. In an embodiment, the first handle 50 forms part of the housing 58. In other embodiments, the first handle 50 is formed separately from the housing 58 and is subsequently attached thereto during assembly. The first handle 50 is formed as an elongated, somewhat cylindrical member that is oriented generally along the longitudinal axis of the power head 42. In other embodiments, the first handle 50 can be any member positioned near the rear end of the power head 42 and is graspable by an operator.

The trigger 52, or other similar speed control mechanism, is positioned immediately adjacent to the first handle 54 to allow an operator to simply and easily control the speed of the power generator 56, as shown in FIG. 3. The trigger 52 is a movable lever, typically operated by an operator's index finger or finger positioned closest to the trigger 52. The trigger 52 is operatively connected to the power generator 56, and is configured to increase the power output to from the power generator 56 when the trigger 52 is pulled and to decrease the power output from the power generator 56 when the trigger 52 is released. The trigger 52 is infinitely adjustable between a full-stop position and a full-power position.

The power generator 56 positioned within the housing 58 is located longitudinally forward relative to the first handle 50 and the trigger 52, as shown in FIG. 3. In the illustrated embodiment, the power generator 56 is an electrically-powered motor which generates an output source of power that is transferrable to the working attachment 46. The output source of power from the power generator 56 may be a reciprocating movement for a working attachment 46 such as hedge trimmers. The output source of power from the power generator 56 may alternatively or additionally be rotational movement for working attachments 46 such as string trimmers, blowers, edgers, tillers, blowers, or chainsaws/polesaws. It should be understood by one having ordinary skill in the art that the type of output from the power generator 56 may be any type(s) sufficient to adequately power any working attachment 46 for the handheld lawn maintenance tool 40.

The second handle 54 is positioned longitudinally forward of the power generator 56, and extends from the housing 58 to allow an operator to simultaneously grasp both the first and second handles 50, 54. The second handle 54 shown in FIG. 3 is a generally D-shaped handle, wherein the angle of the second handle 54 relative to the housing 58 is adjustable in the fore/aft direction for a more ergonomic fit for the operator. In another embodiment (not shown), the second handle 54 is an elongated bar having a padded cover that extends laterally from the housing 58. This second handle 54 that extends laterally is often utilized on string trimmers. In an embodiment, the second handle 54 is removable or otherwise inter-changeable to allow an operator a choice as to the particular design of the second handle 54 based upon preference or upon the type of working attachment 46 attached to the power head 42. The power head 42 is configured to include a second handle 54, thereby providing a more consistent user experience for each of the working attachments 46 attachable The forward distal end of the power head 42 is formed as a first attachment mechanism 60 to which the adapter 44 or a working attachment 46 is secured to positively connect the working attachment 46 to the power head 42, as shown in FIGS. 2-3. In an embodiment, the first attachment mechanism 60 includes a recess 62 into which the adapter 44 or working attachment 46 is received. A power transfer mechanism (not shown) is located within the recess 62, wherein the power transfer mechanism is configured to transfer power from the power generator 56 to the working attachment 46 in order to drive the tool of the working attachment. The first attachment mechanism 60 also includes a spring-biased release button 64 that has an indexing pin (not shown) that extends into the recess 62 and is biased into engagement with the adapter 44 or working attachment 46 when one of those is positioned within the recess 62 of the first attachment mechanism 60. When the adapter 44 or working attachment 46 is inserted into the recess 62 of the first attachment mechanism 60, the indexing pin (not shown) of the release button 64 is pushed outwardly away from the recess 62 until the indexing pin aligns with an indexing aperture (not shown) of the adapter 44 or working attachment 46. Once the indexing pin and indexing aperture are aligned, the indexing pin is biased into the indexing aperture, thereby positively connecting the power head 42 to the working attachment 46. To release the connection to allow the adapter 44 or working attachment 46 from the power head 42, the release button 64 is pushed by the operator, and such actuation causes the indexing pin to be withdrawn from the indexing aperture. With the indexing pin withdrawn from the adapter 44 or working attachment 46, these can then be withdrawn. The illustrated first attachment mechanism 60 is provided as an exemplary embodiment, but it should be understood by one having ordinary skill in the art that any other mechanical mechanism(s) can be used for the first attachment mechanism 60 to provide a positive connection between the power head 42 and the adapter 44 or working attachment 46.

Figure 4:
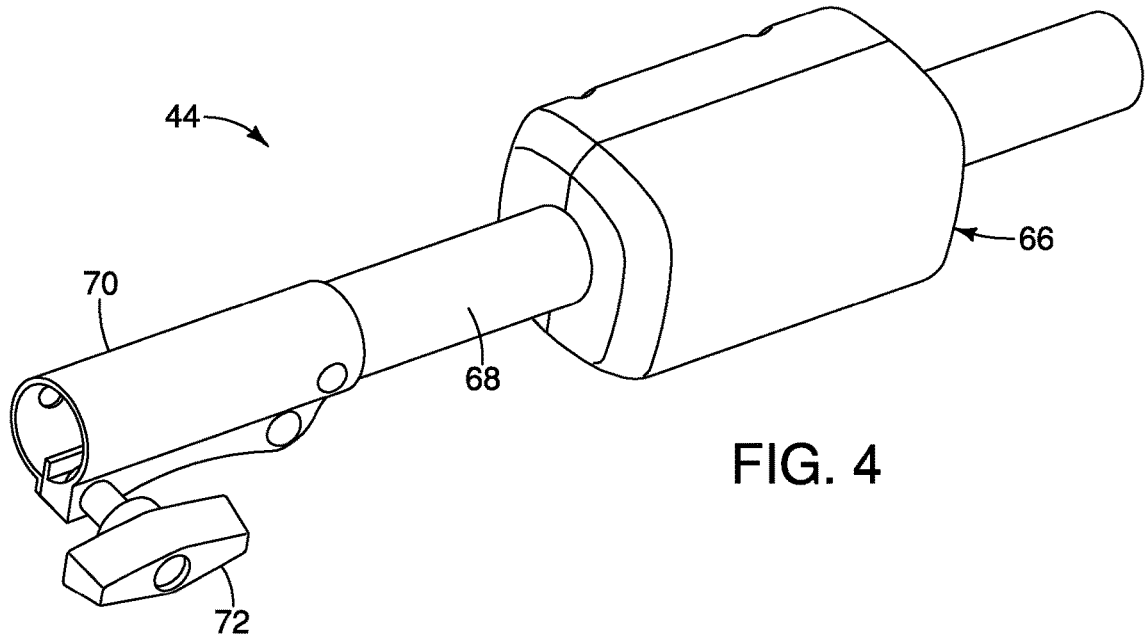
FIG. 4 is an embodiment of an adapter.

FIG. 4 shows an exemplary embodiment of an adapter 44 that is one end that is attachable to the power head 42 and an opposing end that is configured to be attachable to a working attachment 46. The adapter 44 includes a second attachment mechanism 66, an extension member 68, and a first connector 70. The second attachment mechanism 66 is formed as a cap that is either insertable into the recess 62 of the first attachment mechanism 60 or is positionable about the first attachment mechanism. The second attachment mechanism 66 is configured to allow the adapter 44 to be releasably attachable to the power head 42. It should be understood by one having ordinary skill in the art that the second attachment mechanism 66 can be formed as any structure sufficient to correspond to the first attachment mechanism 60 to allow for a releasable attachment between the first and second attachment mechanisms 60, 66.

In the illustrated embodiment, the adapter 44 further includes an extension member 68 that extends between the first attachment mechanism 60 and the first connector 70, as shown in FIG. 4. The extension member 68 is a generally tubular member that is hollow but may include a mechanism for transferring rotation from the power generator 56 to the tool of the working attachment 46. The length of the extension member 68 should be long enough to provide at least a nominal extension of length between the working attachment 46 and the power head 42. In an embodiment, the extension member 68 is adapted to provide either an extension of length for the handheld lawn maintenance tool 10 and/or a conduit for conducting power from the power head 42 to the working attachment 46.

The adapter 44 further includes a first connector 70 that is configured to provide an attachment to working attachments 46 that are either battery-powered or gasoline-powered. The first connector 70 includes a spring-biased indexing pin (not shown) similar to the spring-biased indexing pin of the first attachment mechanism 60. The first connector 70 further includes a rotatable handle 72 having a threaded engagement such that rotation of the handle 72 causes the end of the threaded engagement to contact and abut the working attachment 46 to provide a secure or secondary connection between the working attachment 46 and the adapter 44.

Figure 5:
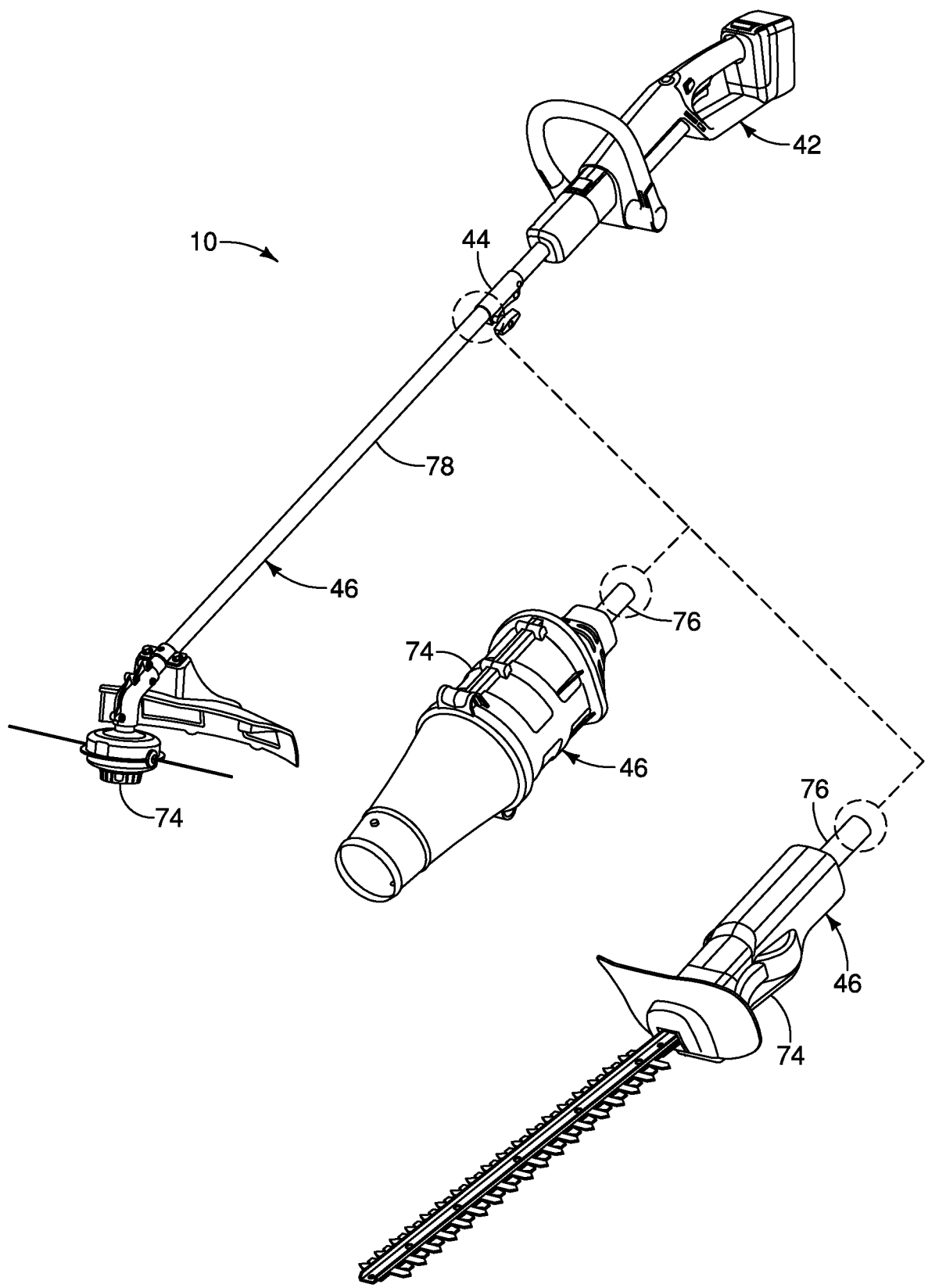
FIG. 5 shows a schematic of multiple working attachments being releasably attachable to a power head at a plurality of positions.
Figure 6A:
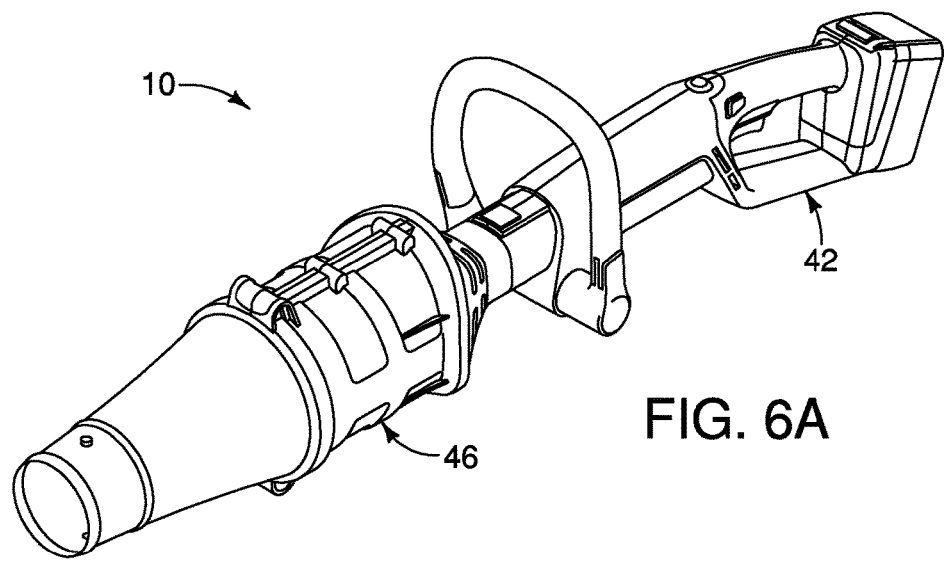
FIG. 6A is a working attachment attachable directly to a power head.
Figure 6B:
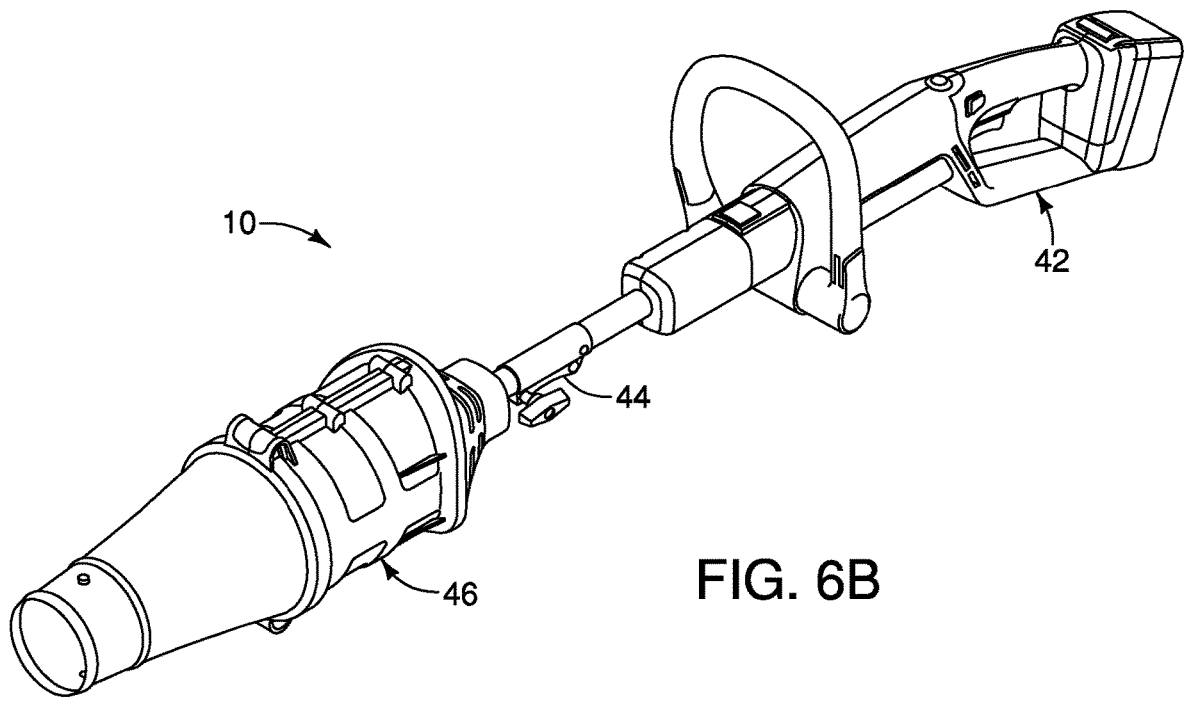
FIG. 6B is the working attachment shown in FIG. 6A attachable to an adapter that is attached to the power head.

FIG. 5 illustrates a power head 42 attached to an adapter 44, wherein a working attachment 46 is attached to the adapter 44. The illustrated working attachments 46 are a string trimmer, an axial blower, and a hedge trimmer. Each of the working attachments 46 is attachable to the adapter 44 or directly to the power head 42. Each working attachment 46 includes a tool 74 having a second connector 76 extending therefrom. The working attachment 46 formed as a string trimmer is attached to a separate boom 78 that extends between the second connector 76 and the tool 74. The boom 78 is an elongated member that is generally hollow tubular member that allows the tool 74 to be positioned a distance away from the power head 42. The working attachment 46 formed as an axial blower includes a second connector 76 that allows the axial blower to be releasably attachable to both the adapter 44, the power head 42, as shown in FIGS. 6A-6B.

Figure 7A:
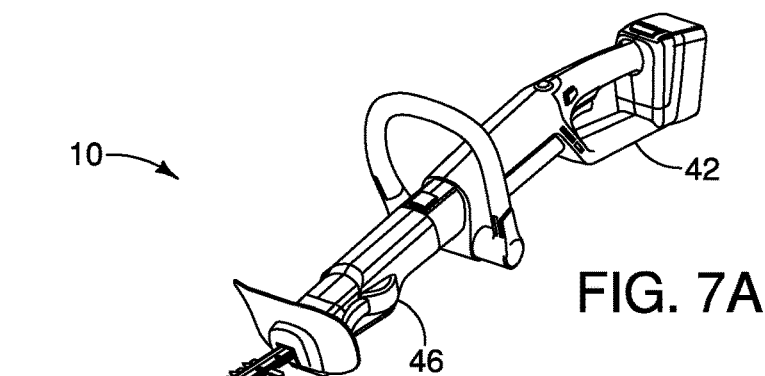
FIG. 7A is a working attachment attachable directly to a power head.
Figure 7B:
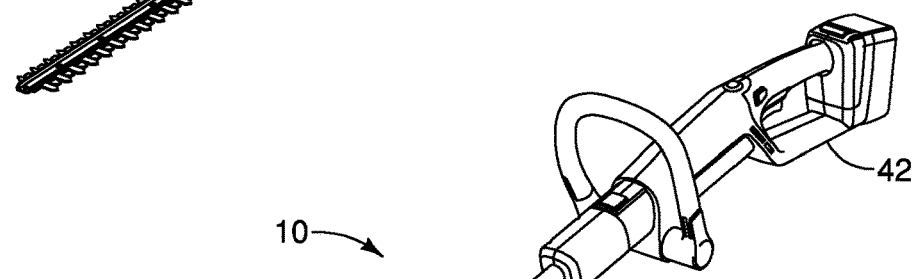
FIG. 7B is the working attachment shown in FIG. 7A attachable to an adapter that is attached to the power head.
Figure 7C:
FIG. 7C is the working attachment shown in FIG. 7A attachable to a boom that is attached to an adapter that is attached to the power head.

In another embodiment in which the illustrated working attachment 46 is formed as a hedge trimmer being attachable directly to the power head 42, as shown in FIG. 7A. The hedge trimmer working attachment 46 is also attachable to an adapter 44 that is attached to the power head 42, as shown in FIG. 7B. The hedge trimmer working attachment 46 is further attachable to a boom 78 that is attachable to the adapter 44 that is connected to the power head 42, as shown in FIG. 7C. FIGS. 7A-7C illustrate the manner in which working attachments 46 are attachable directly and/or indirectly to the power head 42. The power head 42 having integrated first and second handles 50, 54 as well as having the power generator 56 also integrated into the power head 42 reduces the stress and required effort for an operator, even when the working attachment 46 is positioned in a cantilevered, extended position as shown in FIG. 7C.

Figure 8:
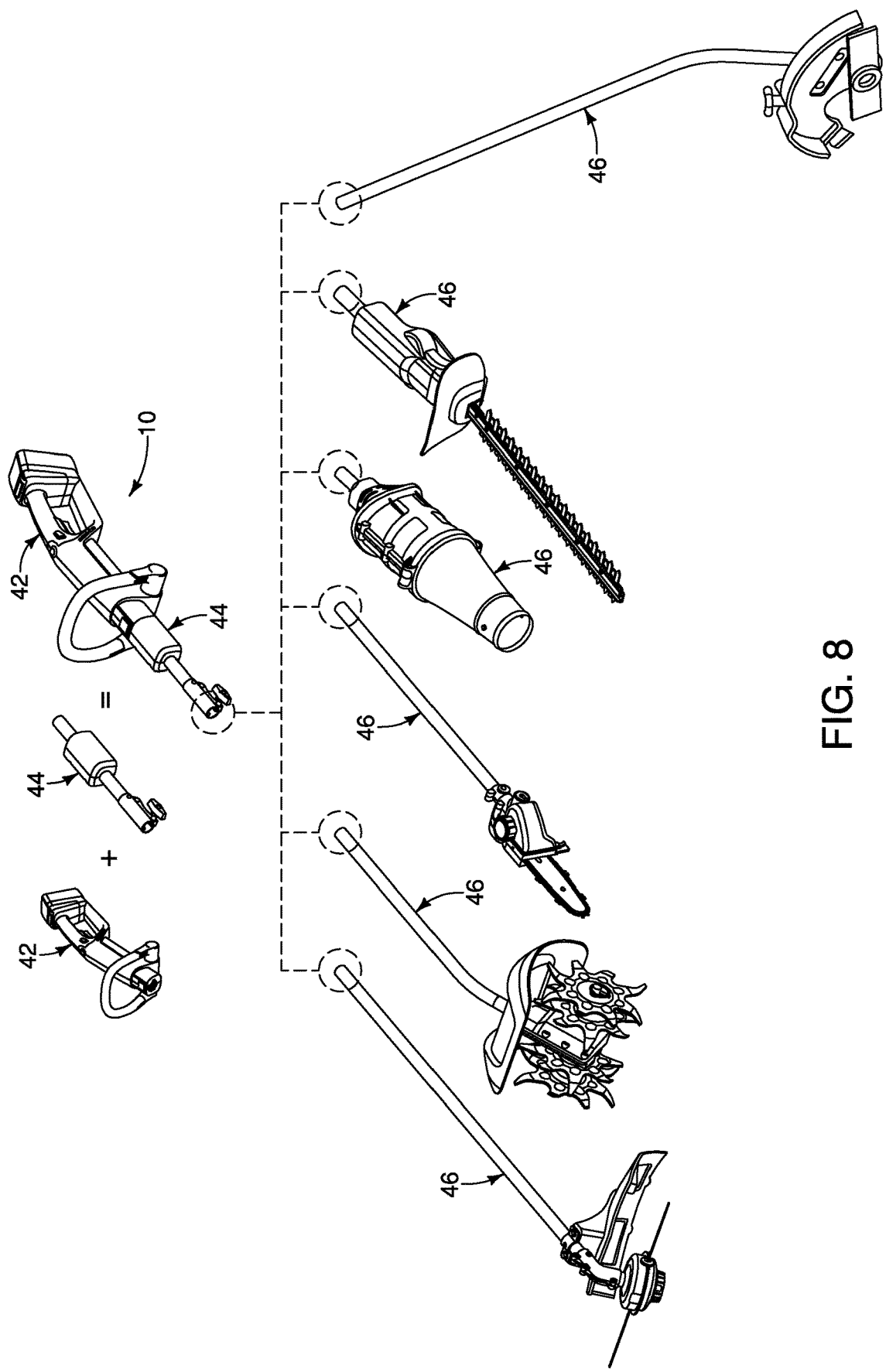
FIG. 8 is a schematic of multiple gasoline-powered working attachments being attachable to an adapter attached to a power head.

FIG. 8 illustrates alternative working attachment 46 embodiments, including (from left to right) a string trimmer, an edger, a tiller, a chainsaw or polesaw, a blower, and a hedge trimmer. Each of the working attachments 46 shown in FIG. 8 are powered by a gasoline engine located within the power head, but the adapter 44 of the present invention allows these working attachments 46 to be attachable to a power head 42 in which the power generator 46 is a battery or otherwise non-gasoline-powered.

Figure 9:
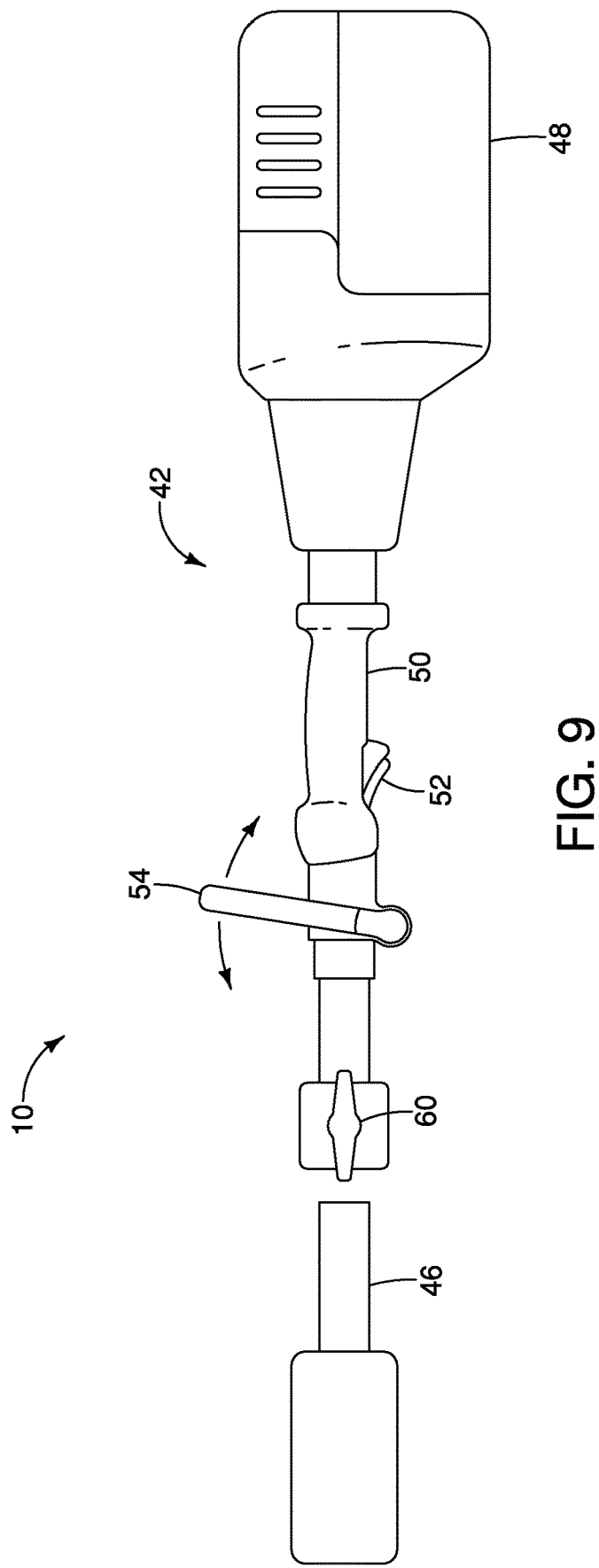
FIG. 9 is another embodiment of a power head having a combined power source/power generator as well as integrated first and second handles.

In another embodiment, the power head 42 includes a power source 48 that is formed as a combined power source and power generator, wherein the combined mechanism is an internal combustion engine powered by gasoline, propane, diesel, compressed natural gas, hydrogen gas, biofuel, or the like, as shown in FIG. 9. This power source/power generator is positioned at the rear end of the power head 42 in order to aid in balancing the weight of the working attachment 46 that extends from the forward end of the power head 42. The power head 42 includes an integrated first and second handles 50, 54 as well as a first attachment mechanism 60, which is configured to be releasably attachable to the working attachment 46.

While preferred embodiments of the present invention have been described, it should be understood that the present invention is not so limited and modifications may be made without departing from the present invention. The scope of the present invention is defined by the appended claims, and all devices, processes, and methods that come within the meaning of the claims, either literally or by equivalence, are intended to be embraced therein.

What is claimed is:

1. A handheld lawn maintenance tool comprising a power head having a power source connected to a rear end of a housing, said housing including a first handle oriented along a longitudinal axis of said power head, a second handle extending from a fixed pivot point on a lower portion of said housing adjacent to a forward end of said housing, a control mechanism positioned adjacent to said first handle, a power generator located within said housing and operatively connected to said power source, and a first attachment mechanism configured to releasably attach alternately to a working attachment and to an adapter configured to connect to the working attachment, wherein said power generator is positioned between said first handle and said second handle, said power generator generates an output source of power, wherein the adapter is configured to alternately attach to a first working attachment and a second working attachment, wherein the first working attachment is battery-powered, wherein the second working attachment is engine-powered, and wherein the adapter comprises an extension member configured to conduct electrical power to the first working attachment and to provide movement to the second working attachment.

2. The handheld lawn maintenance tool of claim 1, wherein said power source is removably attachable to said housing.

3. The handheld lawn maintenance tool of claim 2, wherein said power source is a rechargeable battery.

4. The handheld maintenance tool of claim 1, wherein said power source is a connecting mechanism for creating an electrical connection via a power outlet.

5. The handheld lawn maintenance tool of claim 1, wherein said output source of power generated by said power generator is reciprocating movement or rotational movement.

6. The handheld lawn maintenance tool of claim 1, wherein said second handle is rotatable in a fore/aft manner relative to said longitudinal axis.

7. The handheld lawn maintenance tool of claim 1, wherein said first attachment mechanism includes a spring biased release button for disengaging said working attachment or said adapter from said power head.

8. The handheld lawn maintenance tool of claim 1, wherein said first handle is in substantially linear alignment between said power source and said power generator.

9. A handheld lawn maintenance tool comprising:
a power head having a power source releasably attached thereto, said power head including a power generator electrically connected to said power source for generating output power, a first attachment mechanism operatively connected to said power generator, a trigger operatively connected to said power generator for selectively controlling said output power from said power generator, a housing, a first handle and a second handle integrally connected to said housing, said second handle extending from a fixed pivot point on a lower portion of said housing adjacent to a forward end of said housing, wherein said power generator is positioned between said first and second handles, and said second handle being rotatable in a fore/aft manner;
an adapter configured to be releasably attached to said first attachment mechanism of said power head, said adapter configured to receive said output power from said power generator; and
a working attachment configured to be releasably attached alternately to said adapter and to said first attachment mechanism of said power head, wherein said working attachment is configured to receive said output source of power alternately from said power generator directly and transferred via said adapter from said power generator to said working attachment, wherein the adapter is configured to alternately attach to a first working attachment and a second working attachment, wherein the first working attachment is battery-powered, wherein the second working attachment is engine-powered, and
wherein the adapter comprises a hollow extension member configured to provide movement to the second working attachment, and wherein the extension member comprises a conduit configured to conduct electrical power to the first working attachment.

10. The handheld lawn maintenance tool of claim 9, wherein said power source is a rechargeable battery or a connecting mechanism for creating an electrical connection with a power outlet.

11. The handheld lawn maintenance tool of claim 9, wherein said power generator produces reciprocating movement or rotational movement.

12. The handheld lawn maintenance tool of claim 9, wherein said working attachment includes a tool.

13. The handheld lawn maintenance tool of claim 12, wherein said tool includes at least one of a hedge trimmer, an edger, a tiller, a chainsaw, a polesaw, or a blower.

14. The handheld lawn maintenance tool of claim 13, wherein said output source of power from said power generator is reciprocating movement or rotational movement that is transferred to said working attachment via said adapter.

15. The handheld lawn maintenance tool of claim 9 further comprising a boom having a first end releasably attachable to said adapter and an opposing second end attachable to said working attachment, said output source of power being transferrable from said adapter to said working tool via said boom.

16. The handheld lawn maintenance tool of claim 9, wherein said first handle is oriented along a longitudinal axis of said power head.

17. The handheld lawn maintenance tool of claim 9, wherein said first attachment mechanism includes a spring biased release button for disengaging said adapter from said power head.

18. A handheld lawn maintenance tool comprising:
a power head including a housing, a power source releasably attached to a rear end of said housing, a power generator positioned within said housing and electrically connected to said power source for generating an output, said housing including a first handle positioned between said power source and said power generator, a second handle extending from a fixed pivot point on a lower portion of said housing adjacent to a forward end of said housing, a first attachment mechanism positioned longitudinally forward of said second handle, a trigger positioned adjacent to said first handle and operatively connected to said power generator for selectively controlling said output of said power generator, wherein said power generator is positioned between said first and second handles, and said second handle is rotatable in a fore/aft manner;
a working attachment configured to be releasably attached alternately to said first attachment mechanism of said power head and to an adapter configured to be releasably attached to said first attachment mechanism of said power head, wherein said output of said power generator is transferred to said working attachment, and said working attachment being formed as a string trimmer, a blower, an edger, a tiller, a chainsaw, or a polesaw, wherein the adapter is configured to alternately attach to a first working attachment and a second working attachment, wherein the first working attachment is battery-powered, wherein the second working attachment is engine-powered, and wherein the adapter comprises an extension member configured to provide electrical power to the first working attachment and to provide movement to the second working attachment.

* * * * *